United States Patent
Hausman et al.

(10) Patent No.: US 7,822,878 B2
(45) Date of Patent: Oct. 26, 2010

(54) DEVICE, SYSTEM, AND METHOD FOR THE AUTOMATIC CONFIGURATION OF A NETWORK COMMUNICATIONS DEVICE

(75) Inventors: Steven Michael Hausman, Johnson City, TN (US); Temple Luke Fulton, Elizabethton, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 727 days.

(21) Appl. No.: 10/622,259

(22) Filed: Jul. 18, 2003

(65) Prior Publication Data

US 2005/0261026 A1    Nov. 24, 2005

Related U.S. Application Data

(60) Provisional application No. 60/436,302, filed on Dec. 23, 2002.

(51) Int. Cl.
*G06F 3/00* (2006.01)
(52) U.S. Cl. .......................................................... 710/3
(58) Field of Classification Search ................ 710/3, 710/305; 709/250; 340/2.4
See application file for complete search history.

(56) References Cited

U.S. PATENT DOCUMENTS

| | | | |
|---|---|---|---|
| 5,127,041 A | 6/1992 | O'Sullivan | 379/59 |
| 5,615,344 A | 3/1997 | Corder | 395/309 |
| 5,649,001 A | 7/1997 | Thomas | |
| 5,729,204 A | 3/1998 | Fackler et al. | 340/825.04 |
| 6,307,880 B1 * | 10/2001 | Evans et al. | 375/222 |
| 6,370,603 B1 | 4/2002 | Silverman et al. | 710/72 |
| 6,496,892 B1 | 12/2002 | Lake et al. | 710/301 |
| 6,965,802 B2 * | 11/2005 | Sexton | 700/83 |
| 6,978,319 B1 * | 12/2005 | Rostoker et al. | 709/250 |

(Continued)

FOREIGN PATENT DOCUMENTS

EP    1215549 A2    6/2002

(Continued)

OTHER PUBLICATIONS

Cisco Systems, Token Ring/IEE 802.5, Feb. 20, 2002, Cisco Systems, Inc.*

(Continued)

*Primary Examiner*—Tariq Hafiz
*Assistant Examiner*—Aurangzeb Hassan
(74) *Attorney, Agent, or Firm*—Jose de la Rosa

(57) ABSTRACT

Certain exemplary embodiments comprise a programmable cable further comprising a first end connectable to a PLC and a second end connectable to a network communications device, the network communications device further couplable to a user interface device. The programmable cable can be adapted to store a plurality of configuration parameters in an operative embodiment, the programmable cable can be adapted to automatically configure the network communications device by communicating at least one of a plurality of configuration parameters to the network communications device comprising a pin number. It is emphasized that this abstract is provided to comply with the rules requiring an abstract that will allow a searcher or other reader to quickly ascertain the subject matter of the technical disclosure. This abstract is submitted with the understanding that it will not be used to interpret or limit the scope or meaning of the claims. 37 CFR 1.72(b).

32 Claims, 2 Drawing Sheets

U.S. PATENT DOCUMENTS

2001/0034246 A1* 10/2001 Hutchison et al. ............ 455/557
2001/0037491 A1* 11/2001 Boggs et al. .................... 717/4
2002/0011519 A1* 1/2002 Shults, III .............. 235/462.01
2003/0167391 A1* 9/2003 Al-Ali ........................ 713/153

FOREIGN PATENT DOCUMENTS

WO    WO 00/31608    6/2000

OTHER PUBLICATIONS

PCT International Search Report—mailed Feb. 28, 2005.
PCT Notification of Transmittal of International Search Report.
Cheng, "Real Time Systems: Scheduling, Analysis, and Verification", Book, Aug. 12, 2002, 42 (4 pages total) page(s), John Wiley & Sons, Inc., US.
Halang, "Real-Time Systems: Implementation of Industrial Computerised Process Automation", Book, Jan. 1, 1992, 3, 119, and 297 (5 pages total) page(s), World Scientific Publishing Co. Pte. Ltd., US.

* cited by examiner

DEVICE, SYSTEM, AND METHOD FOR THE AUTOMATIC CONFIGURATION OF A NETWORK COMMUNICATIONS DEVICE

CROSS-REFERENCES TO RELATED APPLICATIONS

This application claims priority to, and incorporates by reference herein in its entirety, U.S. Provisional Patent Application Ser. No. 60/436,302, filed Dec. 23, 2002.

BACKGROUND

Control systems, for example those utilizing computers such as programmable logic controllers (PLCs), can control a broad number and type of devices, including alarms, indicators, actuators, motors, relays, and even input devices, such as sensors. Sometimes, such PLC's are located in remote locations, some of which are accessible via a cellular communications network.

To program, communicate with, and/or receive data from such a remote PLC, a user can access a local user interface device, such as a personal computer, which can be coupled via the cellular telephone network to a cellular modem coupled to the remote PLC. A power failure can cause the remote cellular modem to re-start. If the remote cellular modem requires that a password or other security code be entered at start-up in order to operate, a human local to the cellular modem typically must provide that security code to the modem. Only then can the modem be operable, and the connection established between the user's computer and the remote PLC.

BRIEF DESCRIPTION OF THE DRAWINGS

The invention and its wide variety of potential embodiments will be more readily understood through the following detailed description, with reference to the accompanying drawings in which.

DETAILED DESCRIPTION

Figure 1:
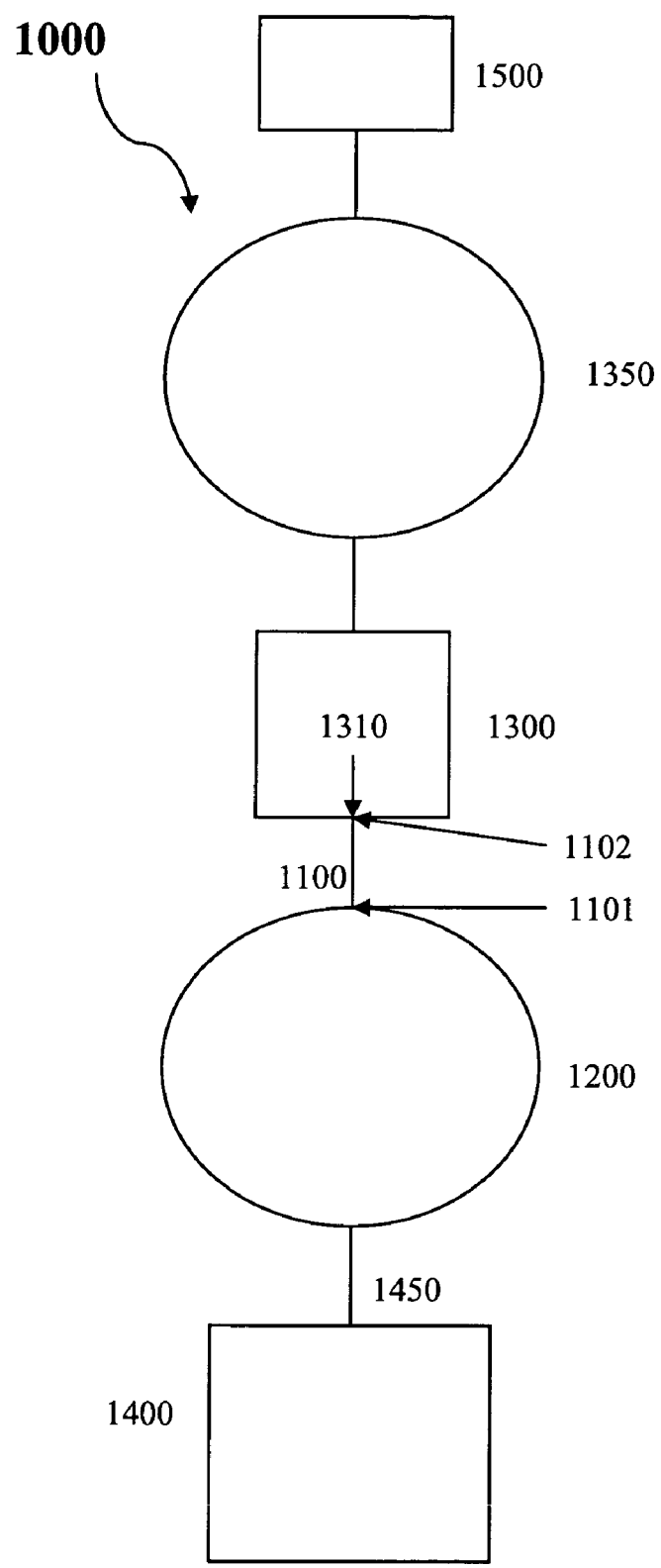
FIG. 1 is a block diagram of an exemplary embodiment of a system 1000.

FIG. 1 is a block diagram of an exemplary embodiment of a system 1000. As illustrated, system 1000 can comprise a programmable cable 1100, which can have a first end 1101 and a second end 1102. In an exemplary embodiment, first end 1101 of programmable cable 1100 can be couplable to a network 1200. Second end 1102 of programmable cable 1100 can be connectable to a network communications device 1300, potentially via a port 1310. Network communications device 1300 can be connectable to a user interface device 1500 by a connection 1350. User interface device 1500 can comprise a telephone, modem, cellular telephone, cellular telephone modem, desktop computer, laptop computer, personal handheld computing device, workstation, minicomputer, mainframe, and/or any other programmable state machine. Connection 1350 can be a wireless device or connection; a wired connection, such as a twisted pair of wires, an coaxial cable, an optical fiber, and/or any other network wire, cable, or fiber; a network, such as a telephone, DSL, cable, wireless, public, private, switched, packet, local area, wide area, virtual, Internet, intranet, and/or other network; and/or any other connective media or connection type, etc. In an exemplary embodiment, network communications device 1300 can be intrinsic to user interface device 1500.

Network 1200 can be couplable to a computer 1400, such as a programmable logic controller (PLC), via a network connection cable 1450, which can comprise a first end and a second end. Both ends of network connection cable 1450 can be connectable to an RS485 interface. Computer 1400 can be connectable through an intrinsic RS485 to the first end of network connection cable 1450. The second end of network connection cable 1450 can be connectable to network 1200, such as a ring-type network, e.g., a token ring network. In an alternative exemplary embodiment, PLC 1400 can be directly connectable through an intrinsic RS485 connection port to first end 1101 of programmable cable 1100.

In an exemplary embodiment, port 1310 can be connectable to an RS232 interface. As used herein, the terms "RS485" and "RS232" refer to Electronics Industry Association interface standards for data communications connections. Alternatively, the port 1310 can be connectable to a USB interface. As used herein, the term "USB" refers to a Universal Serial Bus standard used for data communications. Network communications device 1300 can be a modem, such as a telephone modem, DSL modem, cable modem, wireless modem, etc.; network card; computer; and/or any other networkable communications device. Additional user interface devices 1500 can be couplable to one or more network communications devices 1300, any of which can be connectable to network 1200 via one or more programmable cables 1100. Likewise, multiple computers 1400 can be connectable to network 1200 in certain exemplary embodiments.

Devices connected to network 1200 can be controlled by a token passing technique. Programmable cable 1100 can serve as a token holding master device for network 1200. Programmable cable 1100 can serve as a means of communication between the PLC 1400 and user interface device 1500.

In an exemplary embodiment, programmable cable 1100 can be configurable with parameters that can enable communications between computer 1400 and network interface device 1300, between programmable cable 1100 and user interface device 1500, and/or between computer 1400 and user interface device 1500. Setting at least one of a plurality of configuration parameters can configure a programmable cable 1100. A mode as defined in a mode table I can be a configuration parameter. In an operational embodiment, the programmable cable 1100 can be configured to either a first mode or a second mode of operation.

MODE TABLE 1

| Freeport/PPI Mode Switch | |
|---|---|
| Setting | Description |
| 0 | Freeport mode |
| 1 | PPI mode |

The programmable cable 1100 can be connectable to certain intelligent sensing devices such as a bar code reader, certain PLCs, a modem, and/or a printer, etc. when the programmable cable 1100 is operating in a freeport mode (freely programmable character protocol). In an operating embodiment, when configured in the freeport mode, the programmable cable 1100 can be further configured by selecting a PPI protocol from a protocol table 2. As used herein, the term "PPI" refers to an industry standard point to point network communications protocol that can be a used in a token ring network. The token ring network can comprise at least one of a plurality of token holding master devices. In the freeport mode, a programmable cable 1100 can be configured by setting a PPI protocol comprising either a first PPI protocol or a second PPI protocol. The first PPI protocol can enable 10 bit communications. Alternatively, the second protocol can enable II bit communications.

PROTOCOL TABLE 2

| 11 Bit/10 Bit Protocol Switch | |
|---|---|
| Setting | Description |
| 0 | 11 Bit |
| 1 | 10 Bit |

Programmable cable 1100 can be configurable to a PPI mode. The PPI mode can comprise a protocol wherein the programmable cable 1100 is adapted to, in an operative configuration, serve as a token holding master on the network and can enable multiplexed networked communications with the computer 1400.

A locality mode can be a configuration parameter for the programmable cable 1100. The locality mode can comprise either a first locality mode or a second locality mode selectable from a locality mode table 3. The first locality mode can define a local programmable cable operation. In an operative embodiment, the programmable cable 1100, when in the first locality mode, can be configured by setting a plurality programmable cable 1100 parameters. In operative embodiment, when in the second locality mode, the programmable cable can configure a network communications device 1300 by communicating configuration information comprising a network communication device setup string and a PIN number.

LOCALITY MODE TABLE 3

| Local/Remote Switch | |
|---|---|
| Setting | Description |
| 0 | Local (DCE) |
| 1 | Remote (DTE) |

A data transfer speed can be a configuration parameter for the programmable cable 1100. The data transfer speed can be selectable from a speed table 4. In an operative embodiment, the data transfer speed can be communicated to the programmable cable 1100 as a set of three sequential bits defining a setting from 0 to 7 when converted to decimal form. The programmable cable 1100 can be configured to transmit data at approximate baud rates comprising 1200, 2400, 4800, 9600, 19200, 38400, 57600, or 115200, etc.

SPEED TABLE 4

| Baud Rate Switches 1 2 3 | |
|---|---|
| Setting | Baud Rate |
| 0 | 38400 |
| 1 | 19200 |
| 2 | 9600 |
| 3 | 4800 |
| 4 | 2400 |
| 5 | 1200 |
| 6 | 115200 |
| 7 | 57600 |

A communications language can also be a programmable cable 1100 configuration parameter. The programmable cable 1100 can be adaptable to communication in any one of several languages with at least one user interface device 1500. The programmable cable 1100 can be configurable by selecting the communications language from a language table 5. A programmable cable 100 can be configurable to communicate in any language, such as for example, English, German, French, Italian, Spanish, or Chinese, etc.

LANGUAGE TABLE 5

| Language Configuration | |
|---|---|
| Setting | Language |
| 1 | English |
| 2 | German |
| 3 | French |
| 4 | Italian |
| 5 | Spanish |
| 6 | Chinese |

The network communications device setup string can be a configuration parameter for the programmable cable 1100. The network communications device setup string can be comprised of a set of alphanumeric characters defining a communication protocol and/or a set of communication rules when transferred to at least one of a plurality or network communications device. The network communication device setup string can configure the network communication device with a variety of settings comprising enabling incoming call answering, identifying the number of rings prior to answering an incoming call, enabling outgoing call dialing, establishing a port device communication protocol, selecting pulse or tone dialing, selecting or deselecting a command echo, requesting device specific information, and/or establishing device register settings, etc. An exemplary embodiment of the network communications device setup string can be selected from a setup string table 6. For example, selecting a string ATS0=1 can enable the network communications device 1300 to automatically answer on the first ring. Selecting a string AT+CPIN=12ab can provide the PIN number to the network communications device in an operative embodiment.

SETUP STRING TABLE 6

| Typical AT Commands | |
|---|---|
| AT Index | String |
| 1 | ATS0 = 1 |
| 2 | AT + CPIN = 12ab |

In an exemplary embodiment, the PIN number can be supplied by the programmable cable 1100 to the network communications device 1300 to allow operation of network communication device 1300. In an operative embodiment, a configured and/or operable network communications device 1300 can allow communications between user interface device 1500 and computer 1400.

In certain embodiments, the network communications device 1300 can comprise a subscriber identity module (SIM). The SIM can be a memory device that stores information comprising a subscriber's identification information and networks where the subscriber is entitled to service. The SIM can require a PIN to activate service. SIMs can be available as "smart cards" (credit card sized cards that can be inserted into any compatible device) or plug-in modules. In certain embodiments, the network communications device 1300 can be inoperable without the SIM. The SIM can be compatible with a variety of devices such as telephones, modems, etc., including hotel telephones, public telephones, any other portable or mobile telephone, and/or an analog, digital, cellular, wireless, DSL, and/or cable modem, etc. The existence of a SIM that requires a PIN to operate can discourage the unauthorized use or theft of the SIM and/or the network communications device 1300.

In an operative embodiment, the network communications device 1300 can be installed or power-cycled subsequent to installation which can result in an unconfigured network communications device 1300. An unconfigured network communications device 1300 can require the power cycling of the programmable cable 1100 for the purpose of configuring the network communications device 1300 by supplying parameters comprising the PIN number.

The programmable cable 1100 can be configurable with other settings and/or values in an exemplary embodiment.

The programmable cable 1100 can comprise a first status indicator, a second status indicator, and a third status indicator. The status indicators can be lights and can be operable in a manner as in a status indicator table 7. The first status indicator can be operable to indicate data transmission through the RS485 connector. The second status indicator can be operable to indicate data transmission from the programmable cable 1100 to the user interface device. The third status indicator can be operable to indicate data transmission from the user interface device to the programmable cable 1100.

STARS INDICATOR TABLE 7

| LED | Color |
| --- | --- |
| Tx | RS 232 Transmit Indicator |
| Rx | RS 232 Receive Indicator |
| Xmt | RS 485 Transmit Indicator |

In certain operative embodiments, programmable cable 1100 can be adapted to encrypt and/or decrypt data communicated between programmable cable 1100 and user interface device 1500, computer 1400 and programmable cable 1100, and/or the computer 1400 and user interface device 1500. The encryption and decryption of data can prevent unauthorized data reception, transmission, and/or use. Similarly, the programmable cable 1100 can be adapted to filter communications thereto and/or therethrough, in a manner similar to that provided by firewalls and virus detection software.

In certain exemplary embodiments, a controller or any portion thereof (processor, memory, interface, etc.) incorporated in the programmable cable can be located within and/or adjacent to the housing of an end connector of the programmable cable. Thus, the controller can be of sufficiently small size to be hidden in a housing that appears normal in size, thereby potentially disguising the programmable cable as an "ordinary" cable, and potentially preventing recognition to an untrained observer that the programmable cable is possibly needed to render the network interface device operational.

Figure 2:
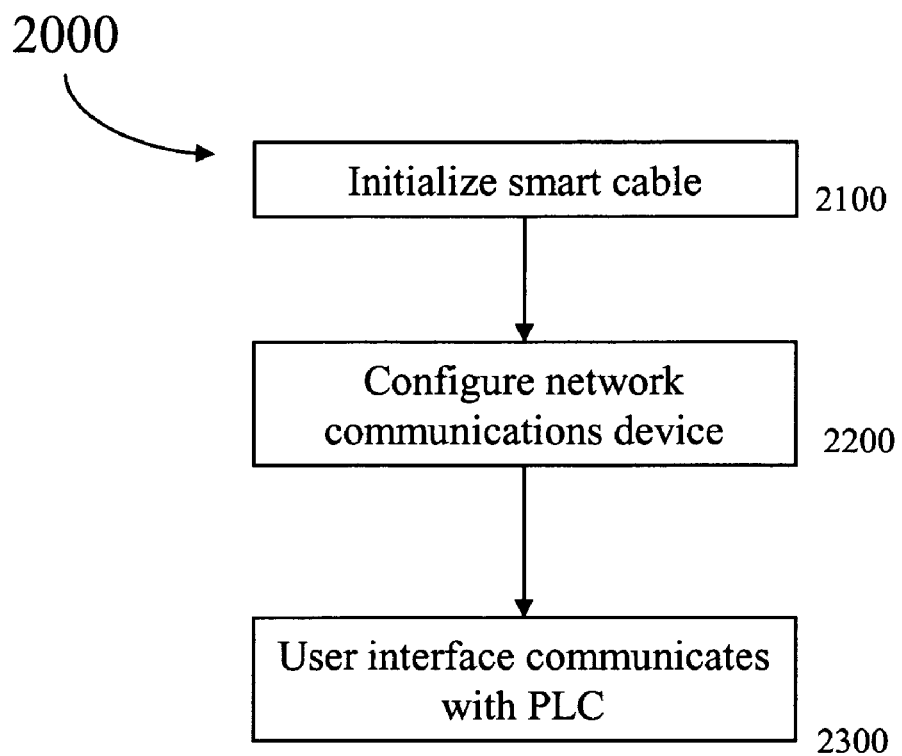
FIG. 2 is a flowchart of an exemplary embodiment of a method 2000.

FIG. 2 is a flowchart of an exemplary embodiment of a method of use. Note that, unless specified otherwise, no particular activity of flowchart 2000 is required, and no particular sequence of activities is required. Thus, any activity shown on flowchart 2000 can be omitted and/or the sequence of activities can vary. In an exemplary embodiment, a programmable cable can be used according to flowchart 2000.

At activity 2100, the programmable cable can be initialized using the user interface device. The programmable cable can be initialized by setting at least one of a plurality of programmable cable parameters comprising: the mode of operation selected from the first mode of operation and the second mode of operation, the PPI protocol selected from the first PPI protocol and the second PPI protocol, the cable locality mode selected from the first locality mode and the second locality mode, the data transfer speed, the communication language, the network communications device setup string, and/or the PIN number.

At activity 2200, the programmable cable at least one of a plurality of configuration parameters with at least one of a plurality of network communications devices. Thus, the programmable cable can automatically configure the network communications device. For example, during and/or subsequent to power-up of the programmable cable and/or the network communications device, the programmable cable can automatically provide a PIN number to enable the network communications device to function. The automatic configuration of the network communications device can take place when the network communications device is power-cycled.

At activity 2300, at least one of a plurality of user interface devices can communicate with the PLC via the programmable cable.

Still other embodiments of the present invention will become readily apparent to those skilled in this art from the above-recited detailed description of certain exemplary embodiments. Accordingly, the drawings and descriptions are to be regarded as illustrative in nature, and not as restrictive.

What is claimed is:

1. A system comprising:
   a cellular telephone modem comprising a subscriber identity module (SIM); and
   a programmable cable comprising a first end directly connectable to a programmable logic controller (PLC) and a second end connectable to said cellular telephone modem, said programmable cable adapted to communicatively couple said PLC and said cellular telephone modem;
   said programmable cable adapted to store a plurality of configuration parameters and a PIN number associated with the SIM, the plurality of configuration parameters comprising a mode switch parameter adapted to cause a mode switch of said programmable cable to select between a Freeport mode and a PPI mode, said mode switch distinct from said PLC, a memory of said programmable cable distinct from said PLC;
   said programmable cable adapted to automatically configure said cellular telephone modem by communicating at least one of the configuration parameters and the PIN number to said cellular telephone modem, said PIN number required by said SIM to activate service and enable the cellular telephone modem to function.

2. A device comprising:
   a programmable cable comprising a first end directly connectable to and communicable with a programmable logic controller (PLC) and a second end connectable to a network communications device comprising a subscriber identity module (SIM), said programmable cable adapted to communicatively couple said PLC and said network communications device, the network communications device further couplable to a user interface device;
   said programmable cable adapted to store at least one of a plurality of configuration parameters, the plurality of configuration parameters comprising a mode switch parameter adapted to cause a mode switch of said programmable cable to select between a Freeport mode and a PPI mode, said mode switch distinct from said PLC, a memory of said programmable cable distinct from said PLC;

said programmable cable adapted to automatically configure the network communications device by communicating the at least one of the plurality of configuration parameters and a PIN number associated with the SIM to the network communications device, said PIN number required by said SIM to activate service and enable the network communications device to function.

3. The device of claim 2, wherein the network communications device is a cellular telephone modem.

4. The device of claim 2, wherein the network communications device is a telephone modem.

5. The device of claim 2, wherein the configuration parameters further comprise a setup string for the network communications device.

6. The device of claim 2, wherein the network communications device is couplable to the user interface device via a network.

7. The device of claim 2, wherein the network communications device is couplable to the user interface device via a cellular network.

8. The device of claim 2, wherein the network communications device is couplable to the user interface device via the Internet.

9. A device comprising:
a programmable cable comprising, a first end connectable to a network couplable to a programmable logic controller (PLC), and a second end connectable to a network communications device comprising a subscriber identity module (SIM); the network communications device further couplable to a user interface device, the PLC communicable with said user interface device using said programmable cable; and said programmable cable programmable to store a PIN number associated with the SIM, said PIN number required by said SIM to activate service and enable the network communications device to function, and at least one of a plurality of configuration parameters comprising: a mode switch parameter adapted to cause a mode switch of said programmable cable to select between a Freeport mode and a PPI mode, said mode switch distinct from said PLC, a memory of said programmable cable distinct from said PLC.

10. The device of claim 9, wherein said programmable cable further adapted to, in an operative configuration, serve as a token holding master on the network adapted to multiplex networked communications with the PLC.

11. The device of claim 9, wherein in an operative embodiment, said programmable cable adapted to automatically configure the network communications device by communicating at least one of the plurality of configuration parameters to the network communications device.

12. The device of claim 9, wherein said second end of said programmable cable comprises an RS232 network connector.

13. The device of claim 9, wherein said second end of said programmable cable comprises a USB network connector.

14. A method comprising the activities of:
providing a programmable cable comprising a first end and a second end, the first end directly connectable to a programmable logic controller (PLC), the second end connectable to a cellular telephone modem comprising a subscriber identity module (SIM), a user interface device couplable to a network comprising the programmable cable, the PLC, and the cellular telephone modem, said programmable cable adapted to communicatively couple said PLC and said cellular telephone modem, said programmable cable adapted to store a PIN number associated with the SIM, said PIN number required by said SIM to activate service and enable the cellular telephone modem to function, and a plurality of configuration parameters, the plurality of configuration parameters comprising a mode switch parameter adapted to cause a mode switch of said programmable cable to select between a Freeport mode and a PPI mode, said mode switch distinct from said PLC, a memory of said programmable cable distinct from said PLC; and automatically configuring the cellular telephone modem by the programmable cable.

15. The method of claim 14, wherein said automatically configuring activity occurs during a power-cycling of the programmable cable.

16. The method of claim 14, wherein said automatically configuring activity occurs after power-cycling the programmable cable.

17. The method of claim 14, further comprising automatically communicating, from the programmable cable to a network communications device, at least one of the plurality of configuration parameters.

18. The method of claim 14, further comprising:
via the user interface device through the network, setting at least one of the plurality of programmable cable configuration parameters comprising: a mode of operation, a PPI protocol, a cable locality mode, a data transfer speed, a communication language, and an identifying PIN number.

19. The method of claim 14, further comprising initializing the programmable cable using the user interface device through the network by setting at least one of the plurality of configuration parameters comprising a network communications device setup string and a PIN number.

20. The method of claim 14, further comprising initializing the programmable cable by setting at least one of the plurality of configuration parameters comprising a network communications device setup string and a PIN number.

21. The method of claim 14, further comprising initializing the programmable cable by setting at least one of the plurality of configuration parameters comprising a PIN number.

22. The method of claim 14, wherein said activity of automatically configuring the cellular telephone modem by the programmable cable further comprises communicating at least one of the plurality of configuration parameters, comprising cellular telephone modem setup string and a PIN number, to the cellular telephone modem.

23. The method of claim 14, further comprising encrypting communications between the user interface device and the PLC.

24. The method of claim 14, further comprising encrypting communications between the programmable cable and the PLC.

25. The method of claim 14, further comprising encrypting communications between the programmable cable and the user interface device.

26. A method comprising the activities of:
providing a programmable cable comprising a first end operatively connectable to a network and a second end operatively connectable to a network communications device comprising a subscriber identity module (SIM), a user interface device operatively couplable to said network comprising the programmable cable, a programmable logic controller (PLC), and the network communications device; and automatically communicating from the programmable cable to the network communications device a PIN number associated with the SIM, said PIN number required by said SIM to activate service and enable the network communications device to function, and at least one of a plurality of configuration parameters, the plurality of configuration parameters comprising a mode switch parameter adapted to cause a mode switch of said programmable cable to select between a Freeport mode and a PPI mode, said mode switch distinct from said PLC, a memory of said programmable cable distinct from said PLC.

27. The method of claim 26, further comprising initializing the programmable cable using the user interface device through the network by setting the at least one of the plurality of configuration parameters further comprising: a mode of operation, a PPI protocol, a cable locality mode, a data transfer speed, and a communication language.

28. The method of claim 26, wherein the configuration parameters communicated to the network communications device further comprise a network communications device setup string.

29. The method of claim 26, further comprising monitoring data traffic through the programmable cable using a set of status indicators.

30. The method of claim 26, further comprising encrypting communications between the user interface device and the PLC.

31. The method of claim 26, further comprising encrypting communications between the programmable cable and the PLC.

32. The method of claim 26, further comprising encrypting communications between the programmable cable and the user interface device.

* * * * *